United States Patent Office 2,848,445
Patented Aug. 19, 1958

2,848,445

CHROMIUM-CONTAINING AZO DYESTUFFS OF THE PYRAZOLONE SERIES

Hans Ruckstuhl, Basel, Switzerland, assignor, by mesne assignments, to Saul & Co., Newark, N. J., as nominee of Fidelity Union Trust Company, executive trustee under Sandoz Trust No Drawing. Application May 10, 1954
Serial No. 428,819

Claims priority, application Switzerland May 12, 1953

1 Claim. (Cl. 260—147)

The present invention relates to new chromium-containing azo dyestuffs of the pyrazolone series.

The new dyestuffs correspond in the metal-free form of the general formula

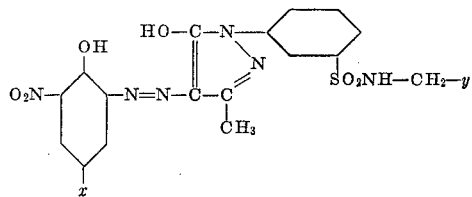

wherein $x$ stands for chlorine or methyl, and $y$ stands for $-CH_2OH$, $-CH.OH.CH_3$, $-CH_2OCH_3$, $-CH_2CH_2OH$ or $-CH_2CH_2OCH_3$. In the corresponding chromium-containing azo dyestuffs according to this invention, less than two atoms of chromium are present for each two molecules of monoazo compound. Thus, they comprise the so-called 1:2-complexes, wherein one atom of chromium is present for about two molecules of monoazo compound. The said 1:2-complexes correspond to the formula

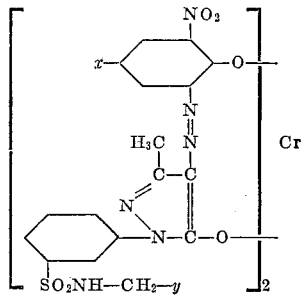

wherein $x$ and $y$ have the previously-recited significances.

The new dyestuffs are obtained by coupling one mol of the diazo compound of 1-hydroxy-2-amino-4-chloro-6-nitrobenzene or of 1-hydroxy-2-amino-4-methyl-6-nitrobenzene with one mol of 1-phenyl-3-methyl-5-pyrazolone-3'-sulfonic acid amide, one hydrogen atom of the sulfonic acid amide group being replaced by a 2-hydroxyethyl, 2-methoxyethyl, 2-hydroxypropyl, 3-hydroxypropyl or 3-methoxypropyl group, and then treating the so-obtained monoazo compound with a chromium-yielding agent.

The coupling of the diazo compound with the azo component is preferably carried out in alkaline medium, the resultant monoazo compound being recovered by filtration. Conversion thereof into the chromium-containing dyestuff is carried out by means of a chromium(III) salt, as for example chromic fluoride, chromic sulfate, chromic formate, chromic acetate, potassium chromium(III) sulfate, in aqueous suspension or solution or in organic medium, for example in formamide, or in a fusion of an alkali salt of a low molecular aliphatic monocarboxylic acid. Chromates, such for example as sodium chromate, potassium chromate, sodium bichromate, potassium bichromate, etc., are also suitable for carrying out the metallization. The chroming of the monoazo compounds with chromates is preferably effected in aqueous caustic alkaline medium, with the addition in some cases of a reducing agent.

Especially valuable metalliferous azo dyestuffs are obtained when less than one atom of metal is introduced per molecule of monoazo compound and, for example, the so-called 1:2-complexes are obtained.

The resultant chromium-containing azo dyestuffs are precipitated from aqueous medium by the addition of sodium chloride—in some cases after the organic metallizing solutions have been poured into water—after which the precipitate is filtered off, and—if desired, after washing—is dried.

The so-obtained chromium-containing azo dysetuffs have an outstanding neutral drawing capacity (affinity) for wool. They dye wool fibers generally from neutral dyebath, and silk from a weakly acid dyebath, in full bluish red shades of very good fastness to fulling and to washing and of excellent fastness to light; they are also suitable for dyeing leather and, in particular, they are excellently suitable for the dyeing of nitrogen-containing synthetic fibers, such as synthetic polyamide fibers (e. g. nylon, Perlon, etc.).

The following examples set forth, by way of illustration and not at all by way of limitation, exemplary presently-preferred embodiments of the invention. In these examples, the parts and percentages are by weight; the temperatures are in degrees centigrade.

EXAMPLE 1

18.9 parts of 1-hydroxy-2-amino - 4 - chloro - 6 - nitrobenzene are dissolved in 200 parts of water with the addition of 14 parts of aqueous sodium hydroxide solution of 30% strength. 6.9 parts of sodium nitrite are added to the resultant solution which is then run, at 0–5°, into 30 parts of hydrochloric acid of 30% strength and ice. The resultant diazo suspension is adjusted to weak alkalinity with sodium carbonate, after which sodium bicarbonate is added. There is then slowly added, dropwise, a solution—rendered alkaline with sodium hydroxide—of 29.7 parts of 1-phenyl-3-methyl-5-pyrazolone - 3'- sulfonic acid - (2''-hydroxy) - ethylamide in 200 parts of water. The monoazo dyestuff which is produced separates out completely; it is filtered off, washed and dried. It is a brown-black powder which dissolves with orange coloration in concentrated sulfuric acid and with red coloration in dilute aqueous sodium hydroxide solution. It dyes wool according to the single bath chroming process in fast bluish red shades.

To convert the monoazo compound into the chromium-containing dyestuff, the former is heated to 95° for 8 hours with 25 parts of sodium acetate and 40 parts of ammonium chromium(III) sulfate in 300 parts of formamide. The reaction mixture is then allowed to cool down to 20–25°, after which it is poured into 700 parts of water; after the addition of 50 parts of sodium chloride, the precipitated chromium complex compound is filtered off. The filtered cake is introduced at room temperature (about 20–30°) into 600 parts of water and 45 parts of aqueous sodium hydroxide solution of 30% strength. After stirring for several hours, 90 parts of sodium chloride are added to the mass; the precipitated chromium-containing azo dyestuff is then filtered off and dried. It corresponds to the formula

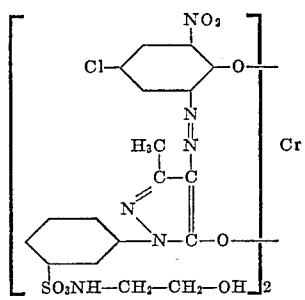

and is a brown-red powder which dissolves with orange-red coloration in concentrated sulfuric acid and with bluish red coloration in water, and which dyes wool, silk and synthetic polyamide fibers from a neutral to weakly acid dyebath in full bluish red shades of excellent fastness to fulling, washing and light.

EXAMPLE 2

The procedure set forth in Example 1 is repeated, except that the 18.9 parts of 1-hydroxy-2-amino-4-chloro-6-nitrobenzene are replaced by the equivalent quantity of 1-hydroxy-2-amino-4-methyl-6-nitrobenzene. A chromium-containing azo dyestuff is obtained which corresponds to the formula

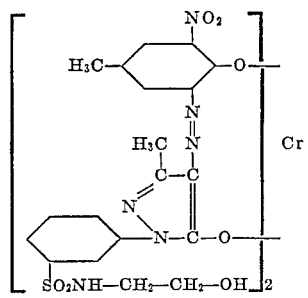

and is characterized by properties similar to those of the product of Example 1.

EXAMPLE 3

A similarly valuable chromium-containing azo dyestuff is obtained when, while otherwise proceeding as described in Example 1, the 29.7 parts of 1-phenyl-3-methyl-5-pyrazolone-3'-sulfonic acid-(2''-hydroxy)-ethylamide are replaced by the equivalent quantity of 1-phenyl-3-methyl-5-pyrazolone-3'-sulfonic acid-(3''-hydroxy)-propylamide. The product according to the present example corresponds to the formula

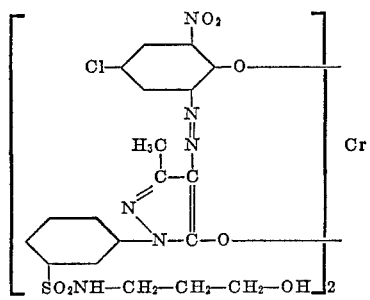

The following table sets forth additional illustrative chromium-containing azo dyestuffs according to the present invention; these may be prepared by following the procedure set forth in Example 1. The table sets forth the respective diazo and azo components involved in preparing the chromium-containing dyestuffs, and the shades of the dyeings thereof on wool. Corresponding dyeings on silk and on synthetic polyamide fibers are of identical shades.

Table

| Example No. | Diazo Component | Azo Component | Shade of Dyeing on Wool |
|---|---|---|---|
| 4 | 1-hydroxy-2-amino-4-methyl-6-nitrobenzene. | 1-phenyl-3-methyl-5-pyrazolone-3'-sulfonic acid-(3''-hydroxy)-propylamide. | bluish red. |
| 5 | 1-hydroxy-2-amino-4-chloro-6-nitrobenzene. | 1-phenyl-3-methyl-5-pyrazolone-3'-sulfonic acid-(2''-methoxy)-ethylamide. | Do. |
| 6 | do | 1-phenyl-3-methyl-5-pyrazolone-3'-sulfonic acid-(3''-methoxy)-propylamide. | Do. |
| 7 | do | 1-phenyl-3-methyl-5-pyrazolone-3'-sulfonic acid-(2''-hydroxy)-propylamide. | Do. |

EXAMPLE 8

1 part of anhydrous sodium sulfate and 0.2 part of the chromium-containing azo dyestuff obtainable according to Example 1 are dissolved in 500 parts of water. 10 parts of pre-wetted wool are entered into the dyebath at 30°, and the bath is then heated to 100° in the course of 15 minutes. The temperature is maintained at 100° for 60 minutes. In the course of the dyeing process, 0.2 part of concentrated acetic acid is added a little at a time. Upon completion of the dyeing, the wool—which is dyed bluish red—is removed from the bath, rinsed with water and dried.

Synthetic polyamide fibers are dyed in identical manner; this is also true of silk, except that in this case a somewhat lower temperature—for example, a temperature of 95°—is employed.

The formula of a representative dyestuff of the table is as follows:

(Example 7)

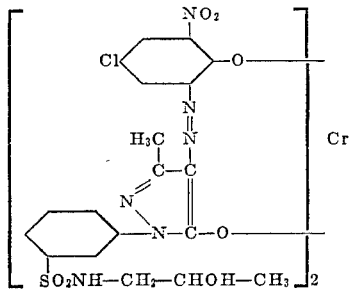

Having thus disclosed the invention, what is claimed is:
The chromium-containing azo dyestuff of the pyrazolone series which corresponds to the formula

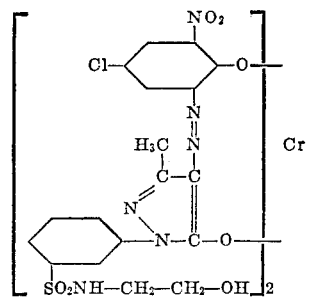

(References on following page)

References Cited in the file of this patent

UNITED STATES PATENTS

| | | |
|---|---|---|
| 2,019,844 | Clingestein et al. | Nov. 5, 1935 |
| 2,565,898 | Widmer et al. | Aug. 28, 1951 |
| 2,659,720 | Kuster | Nov. 17, 1953 |
| 2,673,199 | Widmer et al. | Mar. 23, 1954 |
| 2,673,201 | Zickendraht et al. | Mar. 23, 1954 |

OTHER REFERENCES

Venkataraman: The Chemistry of Synthetic Dyes, vol. 1, pp. 523 (1952).